United States Patent [19]

Hashimoto et al.

[11] Patent Number: 4,605,955

[45] Date of Patent: Aug. 12, 1986

[54] COLOR BALANCE ADJUSTING APPARATUS FOR COLOR TELEVISION CAMERAS

[75] Inventors: Takaaki Hashimoto, Noda; Kazushi Minagawa, Yokohama; Yozo Iida, Komae, all of Japan

[73] Assignee: Nippon Kogaku K.K., Tokyo, Japan

[21] Appl. No.: 490,716

[22] Filed: May 2, 1983

[30] Foreign Application Priority Data

May 7, 1982 [JP] Japan ................................ 57-75313

[51] Int. Cl.$^4$ ............................................. H04N 9/64
[52] U.S. Cl. ................................................... 358/29
[58] Field of Search ............................. 358/29, 50, 42

[56] References Cited

U.S. PATENT DOCUMENTS 4,395,730 7/1983 Shen ....................................... 358/29

FOREIGN PATENT DOCUMENTS 3236269 4/1983 Fed. Rep. of Germany ........ 358/29

Primary Examiner—James J. Groody
Assistant Examiner—Michael P. Dunnam
Attorney, Agent, or Firm—Michael N. Meller

[57] ABSTRACT

A white balance adjusting apparatus for a color television camera detects the color temperature of an illuminating light of an object for shooting and effects the gain balance adjustment of a chromaticity signal circuit in accordance with the detection output. The white balance adjusting apparatus includes at least one attenuating circuit for suitably attenuating the detection output when desired and thereby suppressing the gain balance adjustment during outdoor shooting as compared to indoor shooting.

3 Claims, 2 Drawing Figures

COLOR BALANCE ADJUSTING APPARATUS FOR COLOR TELEVISION CAMERAS

BACKGROUND OF THE INVENTION

The present invention relates to an apparatus for automatically adjusting the white balance in a color television camera.

DESCRIPTION OF THE PRIOR ART

When a scene or object is shot by a color television camera, the light illuminating the scene may be any one of a number of lights varying in nature, such as bright sun or overcast, sunny or open shade, early morning or evening in the case of outdoor shooting and incandescent light or fluorescent light in the case of indoor shooting. Thus, the tones in the televised scene vary in dependence on the illuminating light correspondingly. Usually, the color television camera is basically adjusted so as to precisely reproduce the colors of a shot scene which is generally illuminated at a color temperature of 3200° K. and the white balance is adjusted such that a white object is reproduced in white, thereby ensuring precise reproduction of the colors. The known methods of electrically effecting the white balance adjustment include the method of adjusting the gain of the R (red) signal circuit and the B (blue) signal circuit using the G (green) signal circuit as a reference and the method of adjusting the gain of the R, B and G circuits, respectively. In particular, these methods include one in which a so-called color temperature selector switch is used to select any one of the present values, e.g., two indoor and outdoor values or a greater number of values preset into each circuit, and another method in which after the color temperature selection, a white or achromatic object, e.g., a white sheet of paper, is shot or the lens is covered with a milk-white cap and a white balance adjusting knob is turned in accordance with the indication of a white balance indicator or the like, thereby continuously adjusting the balance of the R, G and B signals and effecting the white balance adjustment more finely.

With these known methods, however, while the white balance adjustment can be effected accurately, this adjusting operation must be performed as a preparatory operation prior to the shooting so that not only is it necessary to preliminarily prepare a specific white or achromatic object, but also there is a disadvantage that if the place of shooting changes or if the light illuminating the scene changes during the shooting, the color tones of the picture become unnatural unless the white balance adjustment is effected again each time, thereby still leaving the problems to be solved for portable television cameras requiring mobility, easy operation and the like.

Measures conceivable for overcoming these deficiencies may be to arrange it so that, while shooting scenes, the operator of the camera operates the color balancing circuit as desired to adjust the white balance in response to the color temperature of the illuminating light varying continuously during the shooting or the operator continues to operate the color balancing circuit at all times. In other words, assuming that, as is well known in the art, the levels of the R, G and B light components contained in a scene to be shot can be considered substantially the same in amount, that is, they correspond to the white if the scene is considered in terms of a wider angle of view, the scene covering a wider angle of view is picked up by sensors respectively having substantially the same spectral characteristics as the R, G and B imaging characteristics of the color television camera and adapted to sense the R, G and B light components independently of the image pickup device of the camera (hereinafter referred to as color temperature sensors), so that the levels of the R, G and B light components contained in the scene are sensed and, for example, the ratios R/G and B/G or differences (R-G) and (B-G) of the R and B components with respect to the reference G component are used as control signals, thereby controlling the gains of the amplifiers of the R signal circuit and the B signal circuit in the color television camera and automatically adjusting the white balance. This method has a very great merit in that there is no need to use any specific white or achromatic object at the stage before the shooting as is the case in conventional color televison cameras, and in that the operator is allowed to effect the white balance adjustment at all times and without interrupting the shooting in response to any changes in the color temperature of the light illuminating the scene. In addition, by placing a milk-white color filter (white color diffuser panel) on each of the sensors for sensing the R, G and B light components and integrally mounting and arranging the sensors in the color television camera body so as to pick up scenes having wider angles of view, it is possible to greatly improve the mobility and operating ease of the portable color television cameras which are used under a very great variety of illuminating conditions and at a great many different shooting locations. However, this method as such still has the following deficiencies. While this method assumes that the R, G and B light components contained in a scene to be shot are substantially the same in amount or are equivalent to the white if the scene is considered in terms of a wider angle of view, an indefinite variety of scenes or objects will be shot by the color television camera, that is, these subjects include a very great variety of types, such as the sea, mountain, park, zoological garden, home, person, and flower, which are different from each other with respect to the size of the objects forming the scene, the surrounding conditions, the colors, the magnitude of reflectivity, the illuminating conditions, etc. Thus, even if a scene covering a wider angle of view is picked up by the shooting at a certain time and place so that the levels of the R, G and B light components contained in the scene show a certain probability distribution and can be considered substantially equal in magnitude from the statistical point of view, a certain range of variations still exists when a great number of objects are considered on the basis of the individual cases. As a result, even if the color temperature of the light illuminating the object remains unchanged, when the directions of the color temperature sensors are changed due to, for example, the panning of the camera, the control signals R/G and B/G, are varied irregularly in the same manner as signals subjected to external noise and the white balance of the camera adjusted by these control signals is also varied. Moreover, the irregular variation of the control signals R/G and B/G usually differs in magnitude (amplitude) between the indoor shooting and the outdoor shooting, so that while, in the case of indoor shooting, the variation of the white balance is such that it cannot be perceived by the human eye, in the case of outdoor shooting the white balance is frequently deviated greatly. Particularly when the camera is panned, there is the danger of producing a very poor picture during the shooting. This takes the form of a variation which is entirely unpredictable to the operator in many cases. The reason is that, particularly in the bright open air, the contrast of a scene to be shot is so strong that even if the scene having a wider angle of view is picked up by the color temperature sensors, actually the particular color of an object forming the light part and having a large area (volume), such as the sea, sky, forest or red building, is detected strongly, whereas the contrast of an indoor object is weak and such object infrequently has a particular color and a large area (volume). In other words, the objects forming the scene and the illuminating conditions are not the same. Moreover, there are the effects of the mounting positions of the color temperature sensors in the camera body, the detecting capacity of the sensors, etc. As described so far, the color television camera using this method has a serious disadvantage in that during outdoor shooting the white balance frequently deviates to such a large extent as would be entirely unpredictable by the operator, thus producing an exceedingly poor picture.

SUMMARY OF THE INVENTION

It is therefore the primary object of this invention to provide a white balance adjusting apparatus for color television cameras which is capable of automatically effecting the white balance adjustment to suit the color temperature of light illuminating a scene to be shot at all times during indoor shooting as well as during outdoor shooting.

In other words, the basic feature of the white balance adjusting apparatus resides in the addition of an attenuating circuit to a white balance adjusting apparatus of the type in which the gain of a chromaticity signal circuit of a color television camera is adjusted automatically in accordance with the output of a color temperature detecting circuit for detecting the color temperature of the light illuminating a shot scene, whereby, when desired, the attenuating circuit applies a predetermined attenuation to the output of the color temperature detecting circuit and the damping effect of the attenuating circuit is utilized in such a manner that the gain adjustment of the chromaticity signal circuit in accordance with the output of the color temperature detecting circuit is suppressed during the outdoor shooting.

In accordance with an embodiment of this invention, a single unit of the attenuating circuit is provided such that the color temperature detecting circuit generates a signal corresponding to the ratio R/B between the red component R and the blue component B in the light illuminating the shot scene and the R/B signal is attenuated when desired.

In accordance with another embodiment of the invention, two units of the attenuating circuit are provided in such a manner that a signal corresponding to the ratio R/G between the red component R and the green component G in the light illuminating the shot scene and a signal corresponding to the ratio B/G between the blue component B and the green component G are generated, and the R/G signal and the B/G signal are attenuated when desired.

Where the color television camera includes a color temperature conversion filter mounted to be moved into and out of the incident light path of the imaging means, preferably a single or two attenuating circuits are arranged so as to selectively perform the attenuating operation in response to the movement of the filter into or out of the light path, that is, the R/B signal or the R/G and B/G signals are attenuated by a predetermined amount only when the filter is positioned in the light path, for example.

In accordance with still another embodiment of the invention, there are provided, in addition to the attenuating circuit, a variable time constant circuit for providing the output of the color temperature detecting circuit with a desired time constant and a time constant control circuit for varying the time of the variable time constant circuit in accordance with the output value of the color temperature detecting circuit, whereby the time constant of the variable time constant circuit is made relatively large through the time constant control circuit to retard the response characteristic of the white balance adjustment when the output value of the color temperature detecting circuit varies within a predetermined range, and the time constant of the variable time constant circuit is made relatively small or reduced to zero through the time constant control circuit to accelerate the response characteristic of the white balance adjustment when the color temperature varies beyond the predetermined range, with the result that the color tones of the picture are varied more naturally in response to the continuous variation or shifting of the illuminating light and the output of the color temperature detecting circuit is attenuated by the attenuating circuit when the output of the color temperature detecting circuit varies in response to any variation of the light illuminating the shot scene other than the simple color temperature variations, thereby preventing the color balancing circuit from operating much in response to any causes other than the color temperature variations and reducing the poorness of the picture.

The present invention will now be described in greater detail with reference to the illustrated embodiments.

DESCRIPTION OF THE PREFERRED EMBODIMENTS

Figure 1:
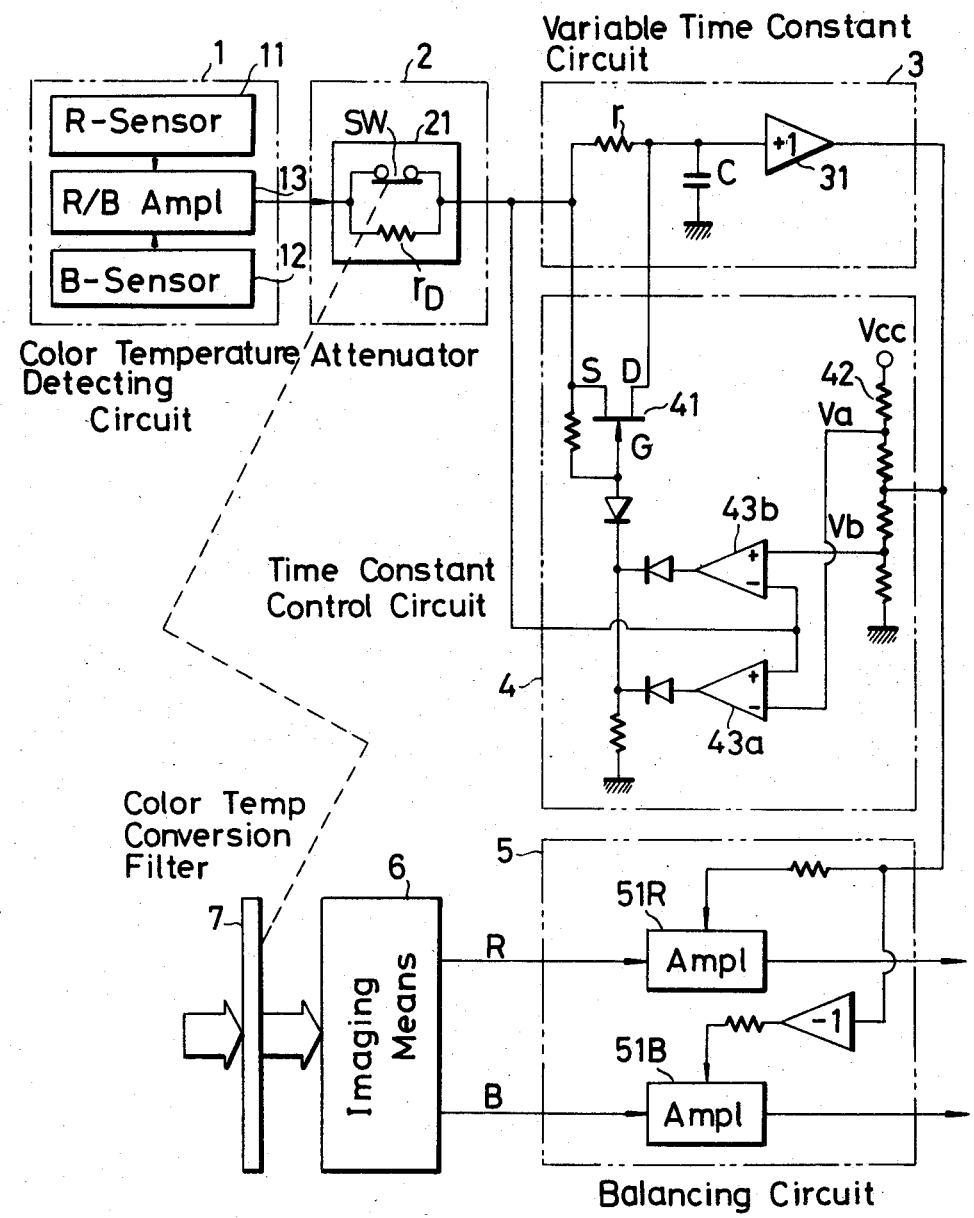
FIG. 1 is a block diagram showing an embodiment of the invention.

Referring to FIG. 1, numeral 1 designates a color temperature detecting circuit for detecting the color temperature of light illuminating an object to be shot, 2 designates an attenuating circuit for attenuating the output of the color temperature detecting circuit 1 by a predetermined amount when desired, for example, during outdoor shooting, 3 a variable time constant circuit for establishing a desired time constant (a time constant $T_1 = r_1 \cdot C_o$ determined by a resistor r having a resistance $r_1$ and a capacitor C having a capacitance $C_o$ or a very small time constant $T_o$ in the illustrated case) for the output signal from the attenuating circuit 2, 4 a time constant control circuit for varying the time constant of the variable time constant circuit 3 to $T_1$ or $T_o$ in accordance with the value of the output signal from the attenuating circuit 2, 5 a color balancing circuit for adjusting the gain of the R and B signal circuits of a camera and therefore adjusting a white balance, 6 imaging means of the camera, and 7 a color temperature conversion filter arranged so as to be moved into or out of the incident light path of the imaging means 6 in response, for example, to the operation of a selector knob.

The color temperature detecting circuit 1 comprises a sensor 11 for sensing only the R (red) component of the light illuminating the shot scene, a sensor 12 for sensing the B (blue) component and an amplifier 13 for computing the ratio R/B between the outputs of the sensors 11 and 12. The sensors 12 are mounted in the camera body so as to pick up a scene having a wider angle of view. Also, the same effect can be obtained by applying the outputs of the sensors 11 and 12 to a logarithmic amplifier instead of the amplifier 13 and deriving a difference output.

The attenuating circuit 2 comprises a variable attenuator 21 for attenuating the output R/B of the color temperature detecting circuit 1 by a predetermined amount only during outdoor shooting. The variable attenuator includes a switch SW which changes its position in response to the movement of the color temperature conversion filter 7 when the operator of the camera operates, for example, an outdoor/indoor shooting selector knob mounted on the camera body, and a resistor $r_D$ which is shunted by the switch SW during indoor shooting and which is inserted in series with the output terminal of the color temperature detecting circuit 1 only during outdoor shooting, thereby utilizing the voltage drop (current limitation) due to the resistor $r_D$ to provide the desired attenuation.

The variable time constant circuit 3 includes the resistor r and the capacitor C as time constant elements and it is so designed that by substantially short-circuiting the ends of the resistor r by the time constant control circuit 4 as will be mentioned later, it is possible to change the time constant from the $T_1 = r_1 \cdot C_o$ to the very small time constant $T_o = r_o \cdot C_o$.

The time constant control circuit 4 comprises an analog switch 41 including a field-effect transistor for substantially short-circuiting the ends of the resistor r to reduce its resistance to a very low value $r_o$, a bleeder circuit 42 whereby the output of the variable time constant circuit 3 applied through a buffer amplifier 31 is divided by resistors with respect to a predetermined dc voltage $V_{cc}$, thereby generating voltage levels $V_a$ and $V_b$ which are respectively slightly higher and lower than the output of the variable time constant circuit 3, and comparators 43a and 43b which each compare the output of the attenuating circuit 2 or the input to the variable time constant circuit 3 with the output of the variable time constant circuit 3 on the basis of the given offset which is established by the bleeder circuit 42 and turn on the analog switch 41 when the input deviates from the offset range.

The color balancing circuit 5 is provided in the chromaticity signal circuit (not shown) of the camera and includes a variable gain amplifier 51R responsive to an increase in the output level of the buffer amplifier 31 of the variable time constant circuit 3 to adjust the gain of the R signal circuit of the camera in a direction to decrease and a variable gain amplifier 51B for adjusting the gain of the B signal circuit of the camera in response to the buffer amplifier output which is inverted in polarity.

The imaging means 6 forms the color imaging section and includes an imaging optical system, image pickup tube or solid-state imaging device and the associated electric circuits. Only the R signal output and the B signal output are shown in FIG. 1 with the brightness(Y) signal output section and the synchronizing signal section being omitted.

The color temperature conversion filter 7 includes an optical filter for suppressing the color temperature of the imaging light incident to the imaging means 6 during outdoor shooting when the color temperature increases as compared with indoor shooting. The filter 7 is moved into and out of the incident light path of the imaging means 6 by means of the selector knob which is not shown. The switch SW of the attenuating circuit 2 changes its position in response to the movement of the filter 7. In the illustrated embodiment, during outdoor shooting the filter 7 is moved into the incident light path of the imaging means 6 by the selector knob and simultaneously the switch SW is opened, thereby attenuating the output of the color temperature detecting circuit 2 through the resistor $r_D$. Note that the color temperature conversion filter 7 may be eliminated if the variable gain amplifiers 51R and 51B of the color balancing circuit 5 are wide-band variable gain amplifiers which operate stably over a wide range of color temperatures, including indoor and outdoor shootings, and in this case the selector knob may be of the type which operates only as a switch (SW).

The color temperature detecting circuit 1 detects the shot scene with a wider angle of view so that its output represents the ratio R/B between the R and B light components contained in the incident light of the wider angle of view this ratio R/B can be considered as the ratio between the R and B components from the scene which are effectively equivalent to the white. Thus, while the output does not vary much if the color temperature of the light illuminating the shot scene does not vary, it includes a component $\Delta(R/B)$ which irregularly varies continuously, from time to time or momentarily in dependence on the contrast and size of the shot object, the directions of the color temperature sensors, the surrounding conditions, etc. Thus, when the component $\Delta(R/B)$ is relatively small as in the case of indoor shooting, the output of the color temperature detecting circuit 1 is not attenuated at all and the output or the gain control input to the color balancing circuit 5 is varied slowly in accordance with the slow and sufficient time constant $T_1 = r_1 \cdot C_o$, thereby slowly adjusting the color balance and preventing the picture from becoming unnatural. On the contrary, when the color temperature of the light illuminating the shot scene varies so that the control signal R/B varies greatly, the comparator 43a or 43b generates an output and the analog switch 41 is turned on. Thus, the ends of the resistor r are substantially short-circuited and the time constant of the variable time constant circuit 3 is reduced to a value close to zero. In other words, the comparator 43a generates an output when the value R/B is greater than that of $V_a$, and the comparator 43b generates an output when $R/B < V_b$. In this way, the analog switch 41 is turned on through one or the other of the comparators only when the value of the generated R/B value is within the offset range between the voltage levels $V_a$ and $V_b$, ane the analog switch 41 is maintained off when the value of the generated R/B is within the offset range. In other words, the gain control of the color balancing circuit 5 is effected slowly with the sufficient time constant when the value of R/B is within the offset range and the gain control of the color balancing circuit 5 is effected with the fast response characteristic when the value of R/B is outside the offset range. Also, during the outdoor shooting the irregularly varying component $\Delta(R/B)$ is usually greater than during the indoor shooting so that the output of the color temperature detecting circuit 1 is attenuated by the desired amount through the variable attenuating circuit 2 and the component Δ(R/B) is converted to a value which is substantially about the same as that during the indoor shooting, thereby effecting the gain control of the color balancing circuit 5 in the same manner as mentioned previously.

In the embodiment shown in FIG. 1, the shot scene is detected with a wider angle of view and the white balance is adjusted in accordance with only the ratio R/B between the R and B components contained in the shot scene. Thus, since the output of the color temperature detecting circuit 1 is attenuated by the desired amount during the outdoor shooting, not only the irregularly varying component Δ(R/B) but also the true component actually carrying the information of the color temperature of the light illuminating the shot scene are attenuated and therefore, strictly speaking, the color temperature detection involves an error. Then, as is well known in the art, the color difference of the light source color is proportional to the difference of the mired value (μrd) or the reciprocal of the color temperature, and in cases where generally a light source having a high color temperature is used, as in the case of outdoor shooting, the previously mentioned error is compressed to such an extent that it can be neglected in the picture. In the embodiment of FIG. 1, this is utilized successfully and the automatic white balance adjustment for color television cameras is attained with a very simple construction.

Figure 2:
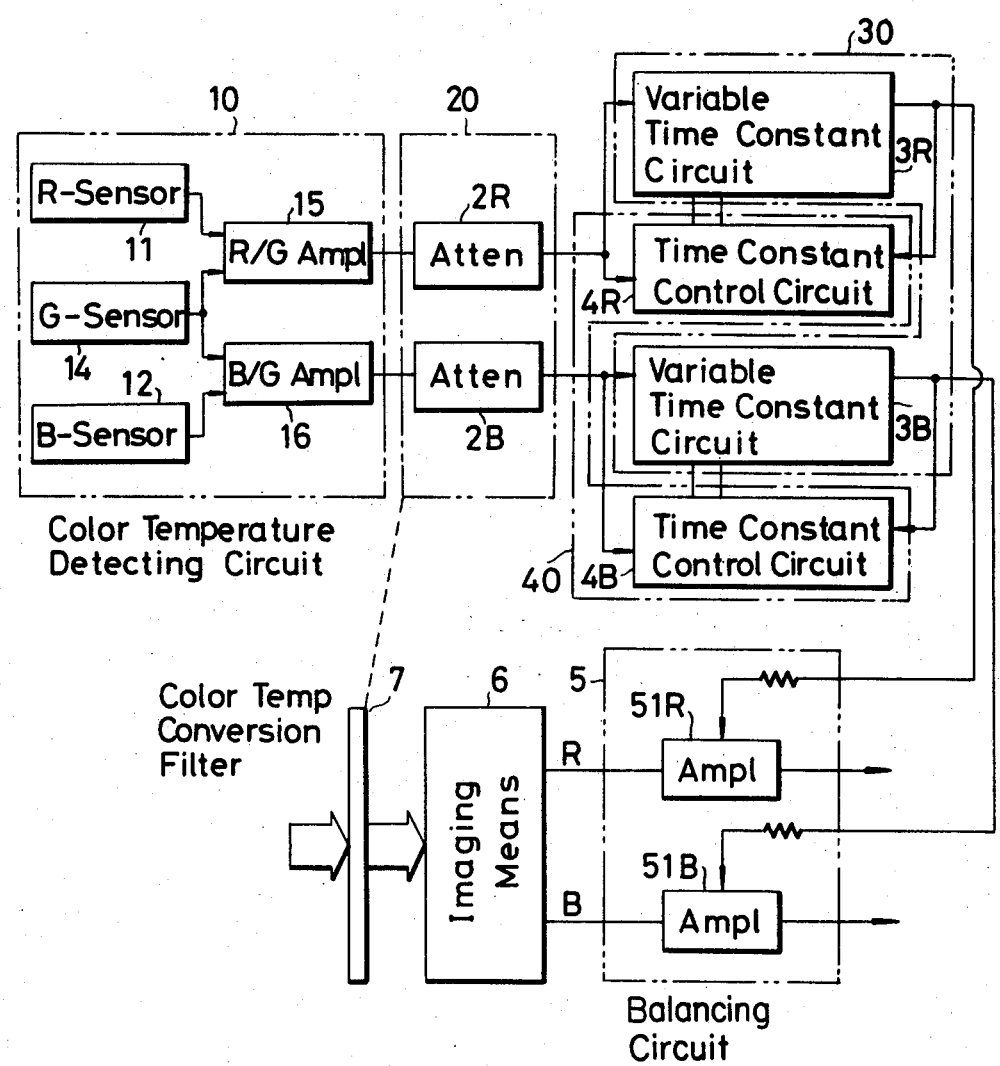
FIG. 2 is a block diagram showing another embodiment of the invention.

FIG. 2 shows another embodiment of the invention in which a color temperature detecting circuit 10 is designed so that the illuminating light color component signals from R, B and G sensors 11, 12 and 14 are converted to values R/G and B/G through amplifiers 15 and 16, each serving as a divider, and the values R/G and B/G are each subjected to level discrimination. An attenuating circuit 20, a variable time constant circuit 30 and a time constant control circuit 40 are each divided into two sections in correspondence to the values R/G and B/G. Thus, circuits 20, 30 and 40 include respectively a pair of attenuating circuits 2R and 2B of the same type as the attenuating circuit 2 of FIG. 1, a pair of variable time constant circuits 3R and 3B of the same type as the variable time constant circuit 3 of FIG. 1 and a pair of time constant control circuits 4R and 4B of the same type as the time constant control circuit 4 of FIG. 1.

The outputs from the variable time constant circuits 3R and 3B separately control a gain amplifier 51R for the camera R signal circuit and a gain amplifier 51B for the B signal circuit. This construction is advantageous in cases requiring a fine white balance adjustment of the G region as in the case of a fluorescent light, for example.

From the foregoing description it will be seen that in accordance with the white balance adjusting apparatus of the invention, during the outdoor shooting the attenuating circuit prevents the color balancing circuit from frequently exceeding a predetermined offset and coming into operation independently of the color temperature under the effects due to the shot scene other than the variations of the color temperature of the light illuminating the shot scene, thereby ensuring clear pictures having the correspondingly reduced amount of deviation of the white balance and further improving the handiness of portable color television cameras.

What is claimed is:

1. In a color balance adjusting apparatus for automatically adjusting the gain of a chromaticity signal circuit of a color television camera including a color temperature conversion filter adapted to be moved into and out of an incident light path of imaging means in accordance with an output of a color temperature detecting circuit for detecting the color temperature of an illuminating light of an object for shooting, the combination comprising:
    at least one attenuating circuit for selectively attenuating an output of said color temperature detecting circuit in dependence on whether said color temperature conversion filter is positioned in said incident light path.

2. An apparatus according to claim 1, wherein said attenuating circuit attenuates the output of said color temperature detecting circuit by a predetermined amount only when said filter is positioned in said incident light path.

3. In a color balance adjusting apparatus for automatically adjusting the gain of a chromaticity signal circuit of a color television camera in accordance with an output of a color temperature detecting circuit for detecting the color temperature of an illuminating light of an object for shooting, the combination comprising:
    at least one attenuating circuit for attenuating an output of said color temperature detecting circuit
    a variable time constant circuit for establishing a desired time constant for the output of said color temperature detecting circuit passed through said attenuating circuit; and
    a time constant control circuit for varying the time constant of said variable time constant circuit in accordance with the output value of said color temperature detecting circuit.

* * * * *